Aug. 10, 1954

H. N. STEPHAN 2,686,283

ELECTRIC MOTOR CONTROL FOR
BORING, DRILLING, AND
MILLING MACHINES

Filed June 23, 1948

INVENTOR.
HALLIS N. STEPHAN
BY Hudson, Boughton,
Williams, David & Hoffmann.
ATTORNEYS Aug. 10, 1954

H. N. STEPHAN
ELECTRIC MOTOR CONTROL FOR
BORING, DRILLING, AND
MILLING MACHINES 2,686,283

Filed June 23, 1948

INVENTOR.
HALLIS N. STEPHAN
BY Hudson, Boughton
Williams, David & Hoffmann.
ATTORNEYS

FIG. 3

INVENTOR.
HALLIS N. STEPHAN
BY Hudson, Boughton,
Williams, David & Hoffmann
ATTORNEYS

INVENTOR.
HALLIS N. STEPHAN
BY
Hudson, Boughton,
Williams, David & Hoffmann.
ATTORNEYS Patented Aug. 10, 1954

2,686,283

UNITED STATES PATENT OFFICE 2,686,283

ELECTRIC MOTOR CONTROL FOR BORING, DRILLING, AND MILLING MACHINES

Hallis N. Stephan, Cleveland Heights, Ohio, assignor, by mesne assignments, to The New Britain Machine Company, New Britain, Conn., a corporation of Connecticut Application June 23, 1948, Serial No. 34,673

8 Claims. (Cl. 318—277)

The present invention relates to machine tools and the like and, more particularly, to indexing or positioning mechanism for both angularly and linearly movable, indexible or positionable members.

One of the principal objects of the invention is the provision of novel and improved mechanism for accurately indexing or positioning a machine tool element or other member to a predetermined position.

Another object of the invention is the provision of a novel and improved, power actuated mechanism for accurately indexing a machine tool element or other member to a plurality of successive stop positions attainable by moving the element or member in one direction.

Another object of the invention is the provision of novel and improved, power actuated mechanism including a photoelectric or light sensitive cell for automatically and accurately indexing or positioning a machine tool element or other member to a predetermined position.

Another object of the invention is the provision of a novel and improved, power actuated mechanism for accurately indexing or positioning a machine tool element or other member to a predetermined position wherein the final positioning of the member is controlled by a photoelectric or light sensitive cell.

Another object of the invention is the provision of a novel and improved, power actuated mechanism for accurately indexing or positioning a machine tool element or other member to a predetermined position wherein the movement of the member to approximately its final position is controlled by a scale and indicator and to final position by a second scale and indicator.

A further object of the invention is the provision of a novel and improved machine tool or the like including a movable element and power actuated means for accurately indexing or moving the element to a predetermined position.

The invention resides in certain constructions and combinations and arrangements of parts and further objects and advantages will be apparent to those skilled in the art to which the invention relates from the following description of the preferred embodiment described with reference to the accompanying drawings in which similar reference characters designate corresponding parts throughout the several views, and in which.

Although the invention is applicable to the positioning or indexing of any member which it is desired to move either angularly or linearly to a predetermined position, it is particularly applicable to the indexing of machine tool elements and is herein shown and described as embodied in a work table assembly or unit comprising a power driven, rotatable table member adapted to support a workpiece upon which it is desired to perform a machining operation or a number of machining operations upon different sides thereof.

Referring to the drawings, the reference character 10 designates a table member rotatably supported by a base 11 adapted to be detachably bolted or otherwise secured to the work table of a machine tool; for example, a horizontal boring, drilling and milling machine. The table 10 is rotatably supported upon the base 11 by a central pivot assembly, designated generally as 12, and has a plurality of T-slots 13 in its upper surface through the medium of which a workpiece to be machined may be secured thereto.

If desired, the table 10 may be clamped to the base 11 by a split clamp ring 14 provided with internal flanges which engage within suitable grooves in a circular boss 15 projecting from one end of the base 11 and in the lower part of the table 10. As shown, the adjoining surfaces of the groove in the boss 15 and the flange of the clamp ring 14 which engages therein are tapered so that the table 10 will be securely clamped to the boss 15 and, in turn, the base 11 as the ring is contracted. The clamp ring 14 is contracted by a manually operable screw 16 which projects through suitable flanges 17, 18 on the adjoining ends of the clamp ring and has right and left-hand threaded engagement therewith. In the embodiment shown, opposite ends of the clamp ring 14 are separated by an index bolt mechanism 20; however, this mechanism forms no part of the present invention and is not herein shown or described in detail. Suffice it to say that the index bolt may be projected into suitable apertures formed in the lower part of the table 10, if desired, by movement of an operating handle 21. Neither the clamp ring 14 nor the index or lock bolt enter into the operation of the table assembly, hereinafter referred to, and are normally disengaged and in inoperative position.

The table 10 is adapted to be moved or rotated in opposite directions by an electric motor 25 detachably connected to the rear side of a transmission case 26 at the rear of the base 11 and detachably connected thereto by cap screws 27. As shown, the table 10 is provided with a worm gear 30 bolted to its underside by bolts 31 and spaced therefrom by an annular ring 32. The worm gear 30 is continuously in mesh with a worm 33 keyed to a shaft 34 rotatably supported in suitable bearings in the base 11. The rear end of the shaft 34 is connected by a coupling 35 to the output shaft 36 of the transmission mechanism within the transmission case 26.

The mechanism within the transmission case 26 comprises a worm 40 continuously in mesh with a worm gear 41 and formed integral upon a shaft 42 rotatably supported in the transmission case by suitable bearings and connected by a coupling 43 to the armature shaft 44 of the motor 25. The worm gear 41 is keyed to a shaft 45 and to the left-hand driving sleeve 46 of a double-acting friction clutch of commercial construction including a shiftable member 47 adapted to be shifted to the left, as viewed in Fig. 2, in a manner hereinafter described to connect the driving sleeve 46 with the driven member of the clutch and, in turn, a shaft 48. The left-hand end of the shaft 48 is rotatably supported in an aperture formed in the right-hand end of the shaft 45 and the right-hand end of the shaft is rotatably supported in the transmission case 26 by suitable antifriction bearings. The right-hand driving sleeve 50 is keyed to a worm gear 51 rotatably supported on the shaft 48 and is adapted to be operatively connected to the shaft 48 by movement of the clutch-engaging member 47 toward the right. The clutch shown is a "Maxitorq" floating disk, self-locking, double clutch sold by The Carlyle Johnson Machine Company, 52 Main Street, Manchester, Connecticut, and is shown in Sweet's File for Product Designers, 1944, to which reference is made for a more complete disclosure thereof.

The shaft 45 is rotatably supported in the gear case 26 and the left-hand end thereof projects into an enclosure in the end of the gear case and is adapted to be connected by change gears 52, 53, 54, 55 to a parallel shaft 56 also rotatably supported in the gear case 26, the right-hand end of which is connected to a transversely extending shaft 57 by miter gears 60, 61. The shaft 57 has a worm 62 formed integral therewith which is continuously in mesh with the worm gear 51. The construction is such that with the clutch-engaging element 47 in its neutral position; that is, the position shown in Fig. 2, the worm gear 51 and the driving clutch sleeves 46, 50 associated therewith are continuously rotated in opposite directions when the motor 25 is in operation and upon the shifting of the clutch-engaging element 47 to the left or right, the shaft 48 is connected to the driven clutch element for rotation at a relatively fast speed or at a relatively slow speed, respectively. The change gears 52 to 55 are employed to obtain any desired reduction in speed. The shaft 48 is connected to the transversely extending output shaft 36 by miter gears 66, 67, the former of which is keyed to the shaft 48 while the latter is rotatably supported on the end of a transversely extending fixed shaft 65. The miter gear has a spur gear 70 fixed to the hub thereof, which gear is in mesh with a spur gear 71 keyed to the rear end of the output shaft 36.

The clutch engaging and disengaging member 47 is adapted to be shifted from its neutral position to one or the other of its operating positions and returned to neutral position by a pair of solenoids 72, 73 located within the transmission case 26 and operatively connected to the rear end of a yoke member 74 by links 75, 76, respectively. The yoke member 74 is pivotally supported by a shaft 77 fixed in a boss 78 projecting from the bottom of the transmission case 26 and a cross brace 80 extending across the top of the transmission case underneath the removable cover 81 thereof. The left-hand end of the transmission case 26 is provided with a removable end cover 82 which affords access to the change gears 51 to 55.

In addition to being rotatable by the motor 25, the table 10 may be rotated by hand by applying a suitable crank to either end of the transversely extending shaft 85 rotatably supported in the front end of the base 11 and connected to the forward end of the shaft 34 by miter gears 86, 87. The shaft 85 is preferably provided with the usual dials graduated in degrees and fractions thereof.

The control for the motor 25 and the solenoids 72, 73 includes means for causing the table 10 to move or rotate toward a predetermined position at fast or rapid traverse speed, means to reduce the speed of movement as the table reaches the predetermined desired position, and means for stopping the table in the desired final position to within a small fraction of a degree. To this end the periphery of the table 10 is provided with upper and lower control indications in the form of scales or rows of graduations, designated A and B, respectively, formed by vertical lines 90, 91, respectively, cut in the periphery of the table or, more preferably, formed in the periphery of a metal or like band 92 detachably connected to the periphery of the table as by screws 93, which band can be replaced when it is desired to change the graduations.

Figure 6:
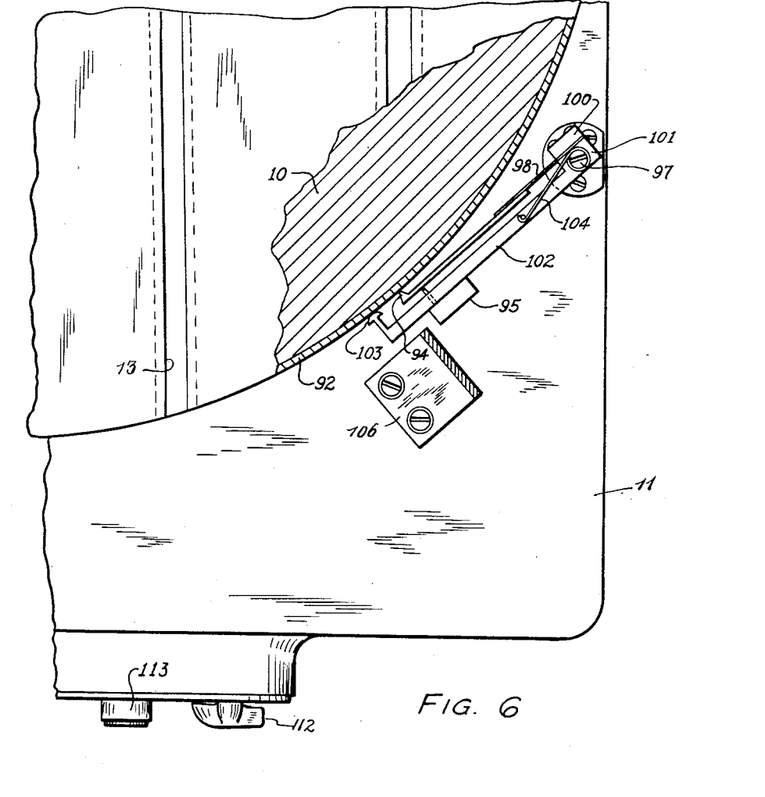
Fig. 6 is an enlarged, fragmentary, plan view of a portion of Fig. 2 with parts shown in section and broken away.
Figure 7:
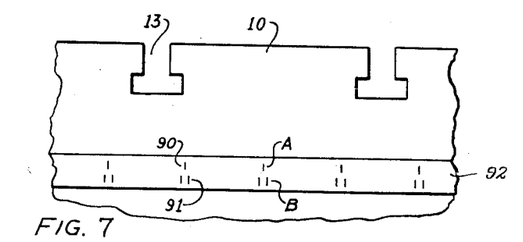
Fig. 7 is an enlarged, fragmentary, side elevational view of a part of the table proper.

The upper row of graduations 90 designate the index positions; that is, the places where it is desired to stop the table. The lower row of graduations 91 comprises two graduations located adjacent to each index graduation or position and spaced slightly at each side thereof. The lower graduations 91 which are cut into the periphery of the table cooperate with a feeler 94 to actuate a toggle type microswitch 95. The feeler 94 comprises a pointed member on the end of a pivoted drum 96 connected to a stationary post 97 bolted to the upper surface of the bed 11. The member 96 is connected to the post 97 by a spring arm 98 fixedly connected to the left-hand end of the member 96, as viewed in Fig. 6. The right-hand end of the spring member 98 is clamped between two pieces of metal 100, 101, the latter of which is fixed to the top of the post 97.

The electric switch 95 is carried by an arm 102 pivoted to the post 97 and provided with a rounded end 103 which rides upon the periphery of the table 10 or band 92. A spring 104 maintains the rounded end 103 of the arm 102 in contact with the surface of the table. When the point 94 of the feeler drops into one of the graduations 91, the switch 95 operates to reduce the speed of rotation of the table, in a manner hereinafter further described.

Figure 1:
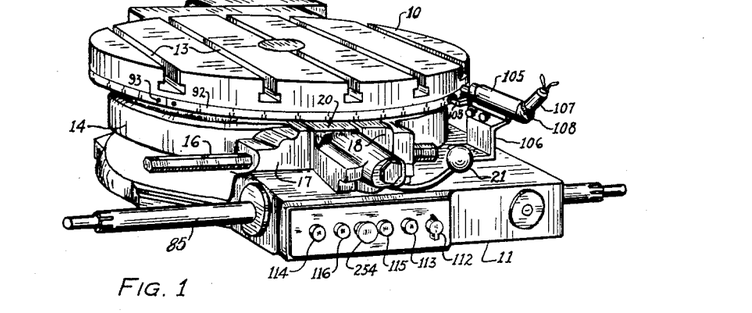
Fig. 1 is a perspective view of a work table embodying the present invention.
Figure 2:
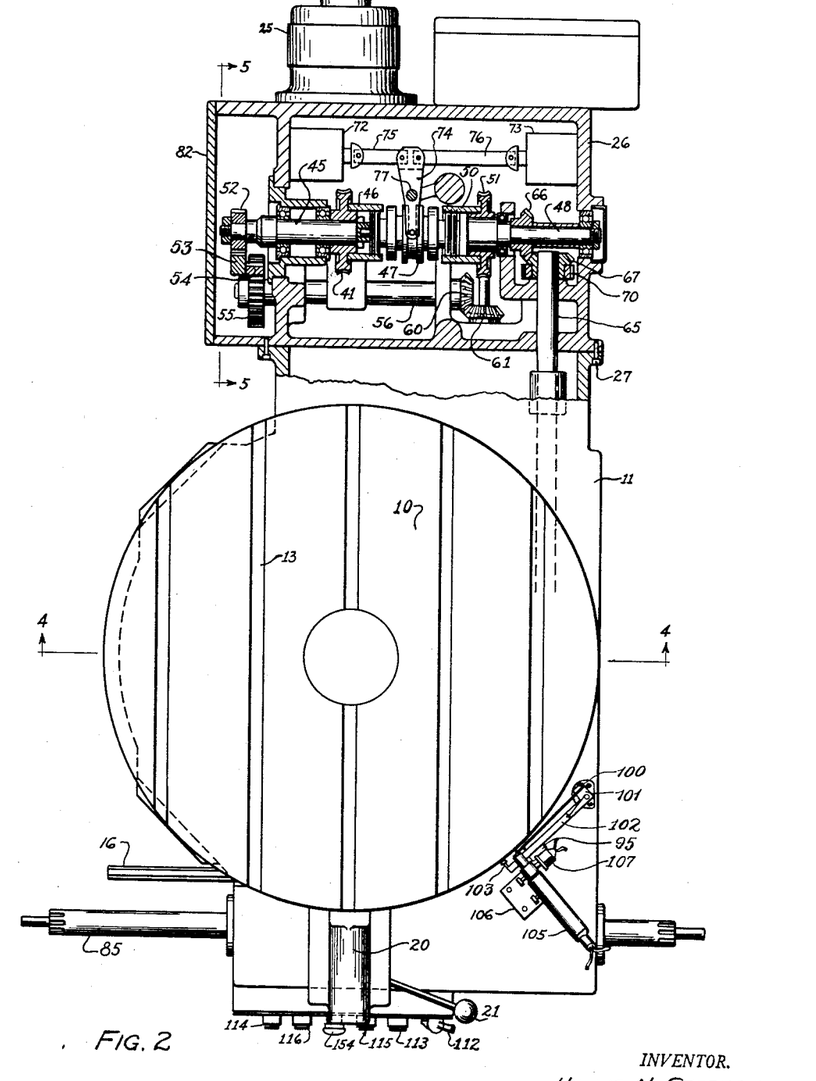
Fig. 2 is a plan view of the work table shown in Fig. 1, with parts in section, approximately on the line 2—2 of Fig. 5.
Figure 3:
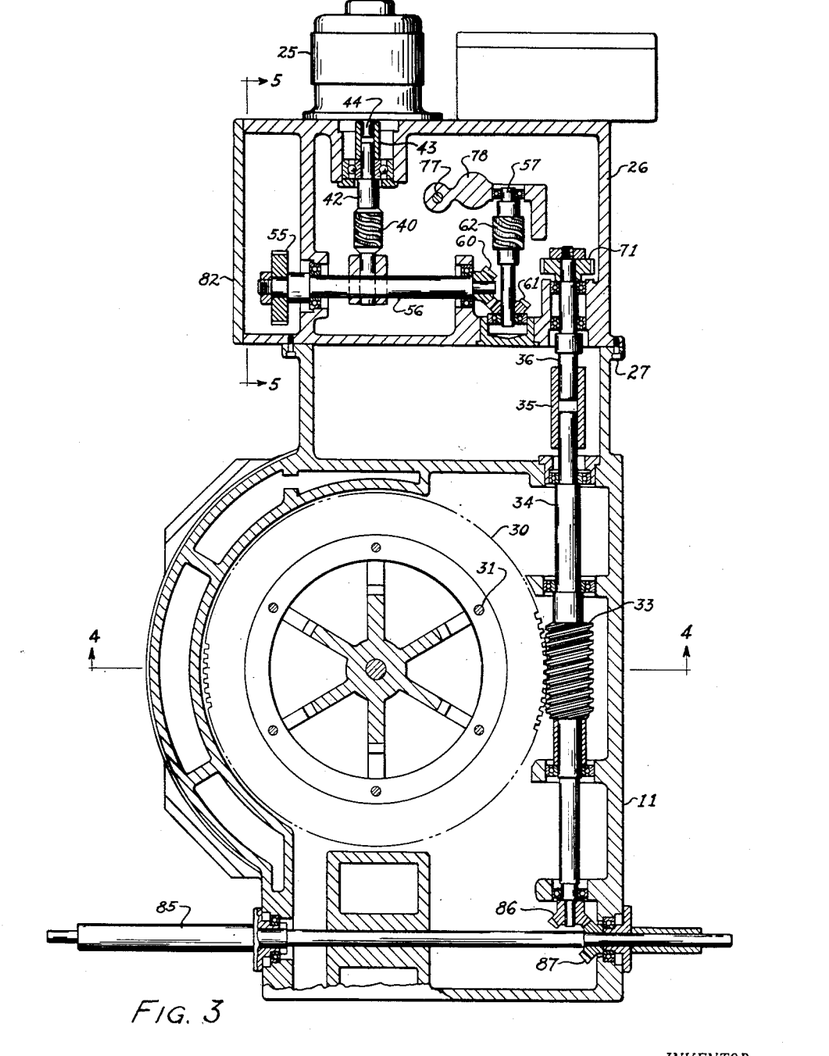
Fig. 3 is a sectional view approximately on the lines 3—3 of Figs. 4 and 5.
Figure 4:
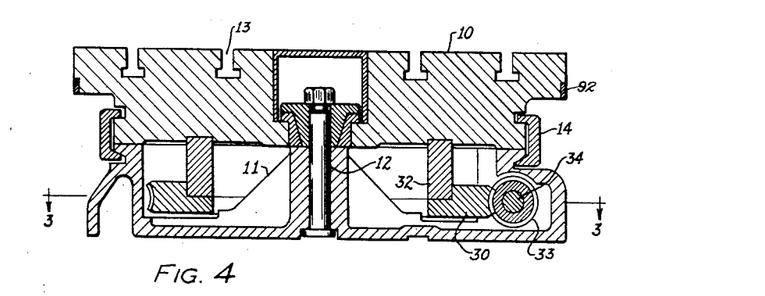
Fig. 4 is a sectional view approximately on the lines 4—4 of Figs. 2 and 3.
Figure 5:
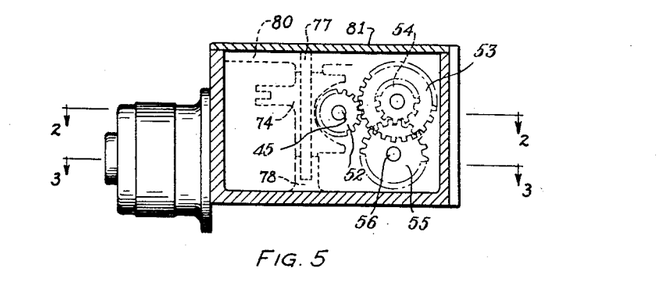
Fig. 5 is a sectional view approximately on the lines 5—5 of Figs. 2 and 3.

The table 10 continues to rotate at reduced speed until the next graduation 90 actuates a photoelectric cell to stop the table in the desired position. In order to increase the accuracy within which the photoelectric cell will stop the rotation of the table, the photoelectric cell is preferably operated through a microscope 105. As shown in Figs. 1 and 2, the microscope 105 is supported by a bracket 106 connected to the top of the base 11 and the photoelectric cell is connected to the eyepiece 107 of the microscope. The photoelectric cell, as shown, is connected to the microscope proper by an inclined eyepiece holder 108 and a conventional eyepiece can be substituted for the assembly 107 to facilitate initial focusing of the telescope. The microscope shown is of commercial construction and includes a vertical illuminator type of light source 107 to increase the light on the periphery of the table 10 which is polished to better reflect the light and the graduations 90 are preferably filled with black, non-reflecting material. The construction is such that when the graduations 90 are centered under the microscope, the light reflected to or reaching the photoelectric cell is reduced sufficiently to operate an electric relay either directly or through an electron or vacuum tube amplifier device. The width of the graduations and the power of the microscope are preferably so chosen that the photoelectric cell operates upon the slightest variation of the graduation from the center of the field of the microscope.

As an alternative construction, the microscope may be carried by member 102 or a member similar thereto so as to better follow the table in the event there is any eccentricity in the table or some other suitable mounting may be employed to maintain the microscope a predetermined distance from the table.

Figure 8:
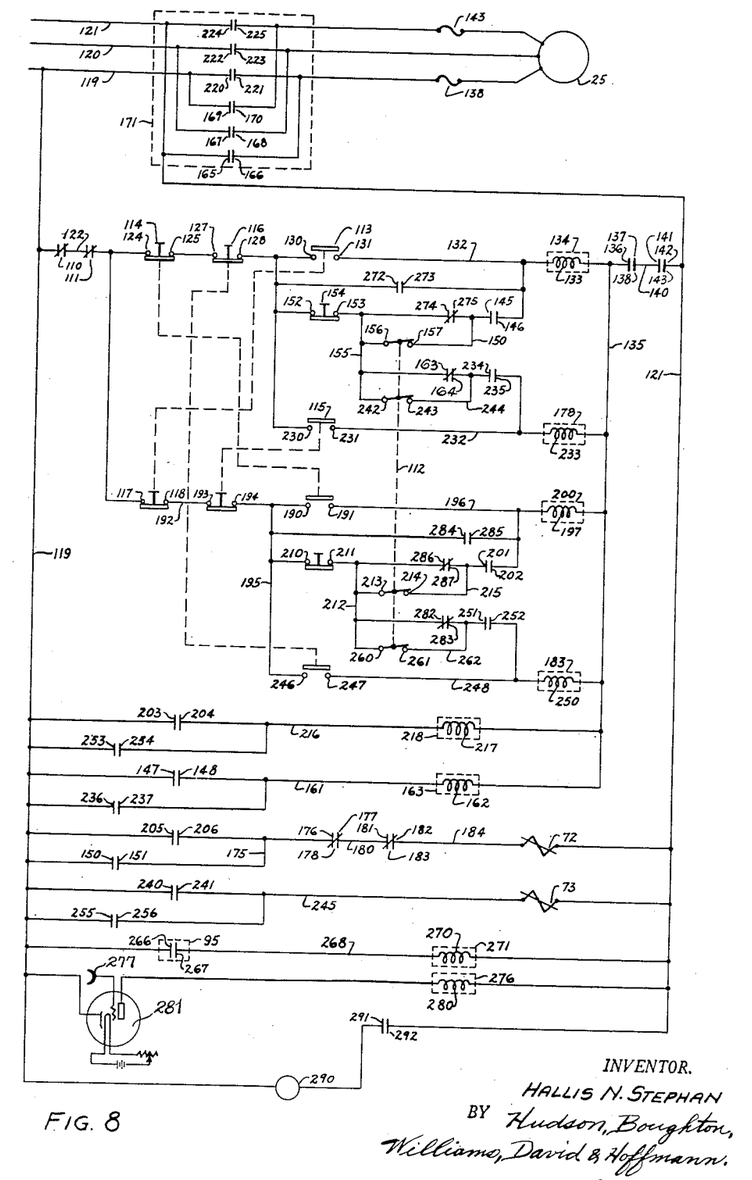
Fig. 8 is a wiring diagram of the control mechanism.

Referring to the wiring diagram, Fig. 8, the reference characters 110, 111 indicate safety switches operatively connected with the table clamp and lock bolt mechanisms, respectively, in such a manner that the switches are open unless the clamp and bolt are released and the table free to rotate. The reference character 112 designates a single throw, four pole, manually operable selection switch which conditions or selects the control for either manual or automatic operation. Rotation of the table 10 at slow or feed speed or fast or rapid traverse speed in either direction; that is, either toward the right or counterclockwise, or toward the left or clockwise, as viewed in Figs. 1 and 2, is effected by depressing the slow speed or feed push button switches 113, 114, respectively, or the fast speed or rapid push button switches 115, 116, respectively.

*Manual operation*

If the slow or feed right push button switch 113 is depressed with the table clamp and lock bolt released and the selection switch 112 set for manual operation, any previously established circuit or circuits causing the table 10 to be moved or rotated toward the left; that is, clockwise as viewed in Fig. 2, are broken by the opening of normally closed contacts 117, 118 of switch 113 in a manner which will be hereinafter apparent and a circuit will be established from the line 119 of the three phase, alternating current supply lines 119, 120, 121 through clamp safety switch 110, wire 122, bolt safety switch 111, wire 123, normally closed contacts 124, 125 of feed left push button switch 114, wire 126, normally closed contacts 127, 128 of fast or rapid traverse left push button switch 116, wire 129, now closed contacts 130, 131 of feed right push button switch 113, wire 132, operating solenoid 133 of feed right relay 134, wire 135, and normally closed contacts 136, 137 of overload relay 138, wire 140, normally closed contacts 141, 142 of overload relay 143 to the line 121.

Energization of the operating solenoid 133 of feed right relay 134 closes the normally open contacts 145 and 146, 147 and 148, 150 and 151 thereof. The closing of contacts 145, 146 establishes a holding circuit around the feed right push button switch 113 from the wire 129 through normally closed contacts 152, 153 or stop push button switch 154, wire 155, now closed contacts 156, 157 of selector switch 112, wire 160, now closed contacts 145, 146 of relay 134, and operating solenoid 133 to wire 135. This holding circuit maintains the operating solenoid 133 of relay 134 energized even though feed right push button switch 113 is released.

The closing of contacts 147, 148 of relay 134 establishes a circuit from the line 119 through the now closed contacts 147, 148, wire 161, operating solenoid 162 of motor reverse relay 163, wire 135 and overload relays 138, 143 to line 121. Energization of the operating solenoid 162 of relay 163 closes the normally open contacts thereof 165 and 166, 167 and 168, 169 and 170 of motor controller 171 connecting the motor 25 to the lines 119, 120, 121 in such a manner that the motor 25 runs in reverse direction. The motor continues to run until the stop push button switch 154 or one of the feed or rapid left push button switches 114, 116 is depressed.

Simultaneously with the closing of contacts 147, 148 of feed right relay 134 and the starting of the drive motor 25, the closing of contacts 150, 151 of the same relay establishes a circuit from the line 119 through the now closed contacts 150, 151, wire 175, normally closed contacts 176, 177 of traverse right relay 178, wire 180, normally closed contacts 181, 182 of traverse left relay 183, wire 184, and feed solenoid 72 to line 121 operating the clutch-engaging element 74 to connect to slow speed or feed drive to the table 10 whereupon the table rotates to the right; that is, in a counterclockwise direction as viewed in Fig. 2. The table 10 continues to rotate until either the stop push button switch 154 or one of the feed or rapid left push button switches 114, 116 is depressed, breaking the holding or maintaining circuit for feed right relay 134.

The table 10 is caused to rotate in the opposite direction; that is, to the left at slow or feed speed by depressing the slow or feed left push button switch 114. The circuits established are similar to those previously referred to. The depressing of feed left push button switch 114 first opens its normally closed contacts 124, 125 stopping the table if it happens to be rotating in the opposite direction either at feed or rapid speeds and then closes its normally open contacts 190, 191. The closing of contacts 190, 191 establishes a circuit from the line 119 through clamp safety switch 110, wire 122, bolt safety switch 111, wire 123, normally closed contacts 117, 118 of feed right push button switch 113, wire 192, normally closed contacts 193, 194 of rapid right push button switch 115, wire 195, now closed contacts 190, 191 of feed left push button switch 114, wire 196, operating solenoid 197 of feed left relay 200, wire 135, and overload relays 138, 143 to line 121.

Energization of operating solenoid 197 of left feed relay 200 closes the normally open contacts 201 and 202, 203 and 204, 205 and 206 thereof. The closing of contacts 201, 202 establishes a holding circuit around the feed left push button switch 114 from the wire 195 through normally closed contacts 210, 211 of stop push button switch 154, wire 212, now closed contacts 213, 214 of selector switch 112, wire 215, now closed contacts 201, 202 of relay 200 to wire 196. This holding circuit maintains the operating solenoid 197 of relay 200 energized even though feed left push button switch 114 is released.

The closing of contacts 203, 204 of relay 200 establishes a circuit from the line 119 through the now closed contacts 203, 204, wire 216, operating solenoid 217 of motor forward relay 218, wire 135 and overload relays 138, 143 to line 121. Energization of the operating solenoid 217 of relay 218 closes the normally open contacts thereof 220 and 221, 222 and 223, 224 and 225 of motor controller 171 connecting the motor 25 to the lines 119, 120, 121 in such a manner that the motor 25 runs in the forward direction. The motor continues to run until the stop push button switch 154 or one of the feed or rapid right push button switches 113, 115 is depressed.

Simultaneously with the closing of contacts 203, 204 of feed left relay 200 and the starting of the drive motor 25, the closing of contacts 205, 206 of the same relay establishes a circuit from the line 119 through the now closed contacts 205, 206, wire 175, normally closed contacts 176, 177 of rapid right relay 178, wire 180, normally closed contacts 181, 182 of rapid left relay 183, wire 184, and feed clutch solenoid 72 to line 121 operating the clutch-engaging element 74 to connect to slow speed or feed drive to the table 10 whereupon the table rotates to the left; that is, in a clockwise direction as viewed in Fig. 2. The table 10 continues to rotate until either the stop push button switch 154 or one of the feed or rapid right push button switches 113, 115 is depressed, breaking the holding or maintaining circuit for right feed relay 200.

The table 10 is caused to rotate to the right at fast or rapid speed by depressing the fast or rapid right push button switch 115 to open its normally closed contacts 193, 194 and close its normally open contacts 230, 231. The opening of contacts 193, 194 opens any previously established circuit causing the table to rotate in the opposite direction and the closing of contacts 230, 231 establishes a circuit from line 119 through clamp safety switch 110, wire 122, bolt safety switch 111, wire 123, normally closed contacts 124, 125 of feed left push button switch 114, wire 126, normally closed contacts 127, 128 of fast or rapid left push button switch 116, wire 129, now closed contacts 230, 231 of rapid right push button switch 115, wire 232, operating solenoid 233 of rapid right relay 178, wire 135, and normally closed contacts 136, 137 of overload relay 138, wire 140, normally closed contacts 141, 142 of overload relay 143 to line 121.

Energization of the operating solenoid 233 of right traverse relay 178 closes the normally open contacts 234 and 235, 236 and 237, 240 and 241 thereof. The closing of contacts 234, 235 establishes a holding circuit around the rapid right push button switch 115 from the wire 129 through normally closed contacts 152, 153 of stop push button switch 154, wire 155, now closed contacts 242, 243 of selector switch 112, wire 244, now closed contacts 234, 235 of relay 178 to wire 135. This holding circuit maintains the operating solenoid 233 of relay 178 energized even though rapid right push button switch 115 is released.

The closing of contacts 236, 237 of relay 178 establishes a circuit from the line 119 through the now closed contacts 236, 237, wire 161, operating solenoid 162 of motor reverse relay 163, wire 135 and overload relays 137, 143 to line 121. Energization of the operating solenoid 162 of relay 163 closes the normally open contacts thereof 165 and 166, 167 and 168, 169 and 170 connecting the motor 25 to the lines 119, 120, 121 in such a manner that the motor runs in reverse direction. The motor continues to run until the stop push button switch 154 or one of the feed or rapid left push button switches 114, 116 is depressed.

Simultaneously with the closing of contacts 236, 237 of rapid right relay 178 and the starting of the drive motor 25, the closing of contacts 240, 241 of the same relay establishes a circuit from the line 119 through the now closed contacts 240, 241, wire 245 and rapid clutch solenoid 73 to line 121 operating the clutch-engaging element 74 to connect to fast speed or rapid drive to the table 10, whereupon the table rotates to the right; that is, in a counterclockwise direction as viewed in Fig. 2. The table 10 continues to rotate until either the stop push button switch 154 or one of the feed or rapid left push button switches 114, 116 is depressed, breaking the holding or maintaining circuit for right rapid relay 178.

The table 10 is caused to rotate in the opposite direction; that is, to the left at fast or rapid speed by depressing the fast or rapid left push button switch 116. The circuits established are similar to those previously referred to. The depressing of rapid left push button switch 116 first opens its normally closed contacts 127, 128 stopping the table if it happens to be rotating in the opposite direction either at feed or rapid speeds and then closes its normally open contacts 246, 247. The closing of contacts 246, 247 establishes a circuit from the line 119 through clamp safety switch 110, wire 122, bolt safety switch 111, wire 123, normally closed contacts 117, 118 of feed right push button switch 113, wire 192, normally closed contacts 193, 194 of rapid right push button switch 115, wire 195, now closed contacts 246, 247 of rapid left push button switch 116, wire 248, operating solenoid 250 of rapid left relay 183, wire 135, and overload relays 138, 143 to line 121.

Energization of operating solenoid 250 of rapid left relay 183 closes the normally open contacts 251 and 252, 253 and 254, 255 and 256 thereof. The closing of contacts 251, 252 establishes a holding circuit around the rapid left push button switch 116 from the wire 195 through normally closed contacts 210, 211 of stop push button switch 154, wire 212, now closed contacts 260, 261 of selector switch 112, wire 262, now closed contacts 251, 252 of relay 183 to wire 135. This holding circuit maintains the operating solenoid 250 of relay 183 energized even though the rapid left push button switch 116 is released.

The closing of contacts 253, 254 of relay 183 establishes a circuit from the line 119 through the now closed contacts 253, 254, wire 216, operating solenoid 217 of motor forward relay 218, wire 135 and overload relays 138, 143 to line 121. Energization of the operating solenoid 217 of relay 218 closes its normally open contacts 220 and 221, 222 and 223, 224 and 225 connecting the motor 25 to the lines 119, 120 and 121 in such a manner that the motor 25 runs in the forward direction. The motor continues to run until the stop push button switch 154 or one of the feed or rapid right push button switches 113, 115 is depressed.

Simultaneously with the closing of contacts 253, 254 of left rapid relay 183 and the starting of the drive motor 25, the closing of contacts 255, 256 of the same relay establishes a circuit from the line 119 through the now closed contacts 255, 256, wire 245 and rapid clutch solenoid 73 to line 121 operating the clutch-engaging element 74 to connect to fast speed or rapid drive to the table 10 whereupon the table rotates to the left. The table 10 continues to rotate in a clockwise direction until either the stop push button switch 154 or one of the feed or rapid right push button switches 113, 115 is depressed, breaking the holding or maintaining circuit for rapid right relay 183.

*Automatic operation*

For automatic operation of the table, the selector switch 112 is spaced or set in automatic position. With the selector switch 112 set for automatic position, the table can be moved in either direction at rapid speed, automatically slowed down to feed speed and subsequently automatically stopped in a predetermined position by pressing one or the other of the rapid push button switches 115, 116. Assuming that rapid right push button switch 115 is depressed, this opens the normally closed contacts 193, 194 thereof and closes its normally open contacts 230, 231. The closing of contacts 230, 231 energizes the operating solenoid 233 of right rapid relay 178 and causes the motor 25 to drive the table at rapid speed toward the right in a manner already described except that in this instance the holding circuit for rapid right relay 178 includes normally closed contacts 263, 264 of relay 265 in series circuit between the wires 155, 232 with contacts 234, 235 of relay 178.

The motor continues to rotate to drive the table toward the right at rapid speed until the pointed end of the feeler member 94 drops into one of the graduations 91 thereby actuating the switch 95 to close its normally open contacts 266, 267. This establishes a circuit from the line 119 through the now closed contacts 266, 267 of switch 95, wire 268, operating solenoid 270 of relay 271 to line 121. Energization of the operating solenoid 270 of relay 265 opens its normally closed contacts 263, 264 and closes its normally open contacts 272, 273. As previously stated, the normally closed contacts 263, 264 are in the holding circuit for rapid right relay 178 and the opening thereof discontinues rotation of the table 10 toward the right at rapid speed but rotation of the table is continued at feed speed by the closing of normally open contacts 272, 273 in shunt circuit across the wires 129, 132 with the normally open contacts 130, 131 of feed right push button switch 113. As soon as the point of feeler member 94 rides up out of the graduation 91, contacts 266, 267 of switch 95 open deenergizing operating solenoid 270 of relay 265 and reopening contacts 272, 273.

The closing of contacts 272, 273 of relay 271 is the equivalent of depressing the feed right push button switch 113 and the table continues to rotate in the same direction as before but at feed speed. The circuits are the same as though the feed right push button switch had been depressed and released except that the holding circuit for feed right relay 134 now includes normally closed contacts 274, 275 of relay 276 in series circuit with normally closed contacts 152, 153 of stop push button switch 154 and contacts 145, 146 of feed right relay 134 across the wires 129 and 132. The table continues to rotate at feed speed until the graduation 90 immediately following the graduation 91 which actuated the switch 95 comes under the object lens of the telescope and fills the field of view of the microscope 185 thereby shutting off the light to the photoelectric or light cell 277 at the eyepiece of the microscope. The light cell 277 is preferably operatively connected to the solenoid 280 of relay 276 through an electronic tube amplifier, designated generally as 281, in such a manner that the operating solenoid 280 is energized when the light is cut off from the photoelectric cell.

The table 10 may be automatically indexed to the next position to the right by again depressing rapid right push button switch 115 and maintaining it depressed until the feeler 94 has passed the graduation 91 immediately following the graduation 90 which determined the last index position. By holding the switch 115 depressed until after the switch 95 has closed and opened, the feed clutch solenoid 72 will not be energized thereby because the normally closed contacts 176, 177 of rapid right relay 178 will be open as long as the rapid right push button switch 115 is held depressed. The microswitch 95 is preferably an extremely sensitive one and stays closed only while the point of the feeler 94 is bottomed in the graduation 91, the construction preferably being such that any movement of the periphery of the table 10 in excess of .001″ in either direction from the position in which the feeler centers in the graduation will open the switch.

The table 10 may be automatically indexed in the opposite direction; that is, toward the left in a similar manner by depressing the rapid left push button switch 116. In this instance, the holding circuit for rapid left relay 183 includes normally closed contacts 282, 283 of relay 271 in series circuit with contacts 251, 252 of relay 183 across the wires 212, 248. When the point on the follower 94 drops into a graduation 91 with the table rotating toward the left it actuates switch 95 to energize the operating solenoid 270 of relay 271 and close the normally open contacts 284, 285 thereof which are in shunt circuit with the normally open contacts 190, 191 of the feed left push button switch 114 across the wires 195, 196. In this instance, the holding circuit for feed left relay 200 includes the normally closed contacts 286, 287 of relay 276, which contacts open to stop the rotation of the table when a graduation 90 shuts off the light to the photoelectric cell 277.

The table 10 may be automatically indexed to the next position to the left by again depressing the rapid left push button switch 116 and holding it depressed until the feeler member 94 has passed the graduation 91 immediately following the graduation 90 which determined the last indexed position. By holding the switch 116 depressed until after the switch 95 has closed and again opened, the feed clutch solenoid 72 will not be energized by the closing of the switch 95 because the normally closed contacts 281, 282 of the rapid left relay 183 will be open as long as the rapid left push button switch 116 is held depressed.

In the embodiment herein shown and described, the invention is applied to or incorporated in a rotatable work supporting table; however, it will be apparent that it is equally applicable to or may be incorporated in a linearly movable work supporting table and to other types of apparatus other than a work support; for example, it may be used to index a tool head to one or a plurality of positions. The invention is particularly applicable where it is desirable to machine or otherwise treat a plurality of duplicate parts. The necessary graduations can be produced on a suitable band by an appropriate device and the band subsequently attached to the work table. The band can be removed and other bands having different graduations suitable for machining different articles substituted therefor. The original band can be saved and reapplied to the machine, if desired.

With the present invention, it is not necessary that the machine operator be a skilled machinist. The bands can be graduated and applied to the machines by a setup man who is a skilled machinist and, thereafter, the machine operator merely needs to depress the proper push button switch and the machine will automatically index to the proper position. If desired, an indicating light 290 in series circuit with the normally open contacts 291, 292 of relay 276 can be connected across the lines 119, 121 to indicate to the operator when the device is in the proper position to start the machining operation; for example, the boring bar feed, in the event the table shown is employed with a boring machine. Alternatively the control can be incorporated in the control for the machine proper so that the feed or other desired operation will be automatically started when the work table has indexed to the proper position. As a still further refinement, the indexing of the work table to the next index position may be automatically started by the retraction of the tool a predetermined distance from the work or upon the occurrence of some other operation by the use of suitable switches or the like controlled by or in relation to the movement of the tool support or carrier, etc.

The present invention also contemplates the use of either the feeler operated microswitch mechanism or the photoelectric cell arrangement shown for stopping a work table or the like at a predetermined position where the table is moved at only one speed. In this event, the lower scale or second row of graduations B would be omitted and the table started to the next index position by depressing one of the feed push button switches instead of the rapid traverse push button switches. As examples of further alternative constructions, a photoelectric cell may be employed with the second row of graduations B in place of the mechanically operated switch disclosed or a feeler operated microswitch similar to that shown may be employed with the first or upper row of graduations in place of the photoelectric cell mechanism. The combination of the feeler mechanism comprising the parts 94 and 96 and the microswitch 95 is in the nature of a surface analyzer and any suitable surface analyzer may be substituted therefor; for example, one employing a piezoelectric unit or a tracer element similar to that shown in U. S. patent to Kuehni et al. No. 2,410,295. Alternatively, any desired surface, such as, opaque lines on a transparent film, hereinafter again referred to, or a magnetizable wire or tape, such as employed in conventional wire or tape recorders provided with graduations or indicia in the form of magnetized sections, may be used in combination with suitable surface analyzing or pickup mechanism.

The scales which control the stopping of the table instead of being directly carried by the table, as are the scales A and B shown, may be the scales upon graduated dials or drums indirectly connected to the table as being connected to a shaft operatively connected to the table, such as the shaft 85. In this event, preferably two dials are employed, one of which makes a single revolution for the entire movement of the table or part to be indexed and the other a plurality of revolutions for each revolution of the first and graduated in fractions of an inch or degree, as the case may be. Dials of this general character are shown in a number of issued patents, such as Edgar Patent No. 1,760,938, Hazelton Patent No. 2,071,402, and Lucas et al. Patent No. 2,350,174. In the event dials of the character referred to are employed, the electrical control circuits can be interlocked so that the feed will not be started every time a graduation upon the second dial corresponding with the scale A passes underneath the microscope but will be started at the proper time. As a further alternative construction, transparent scales or dials may be employed and illuminated from behind and in many instances this may be preferred over the particular form shown wherein the control indications or graduations appear on a highly reflective polished surface.

The present invention can also be employed to index a member in a plurality of directions or two members relatively movable in two directions, such as the movable work table and spindle head of a horizontal boring machine. In this event, one or the other of the members may be indexed to the proper position by manually or automatically starting the cycle of operations and the second member simultaneously or successively indexed to its position by manually or automatically starting its cycle of operations.

From the foregoing, it will be apparent that the objects heretofore enumerated and others have been accomplished and that there has been provided a novel and improved mechanism which can be accurately indexed automatically to a predetermined position. While the preferred embodiment of the invention has been described in considerable detail, the invention is not limited to the particular construction shown and it is my intention to cover hereby all adaptations, modifications and uses thereof which come within the practice of those skilled in the art to which it belongs and the scope of the appended claims.

Having thus described my invention, I claim:

1. In combination with a machine or the like having a supporting member, a member movably supported upon said supporting member and indexable in one direction to a plurality of successive stop positions and multiple speed power actuated means for moving said last-named member relative to said supporting member; electric switch means for reducing the speed of and stopping said power actuated means, a gauge member having signal means thereon for each of said positions for transmitting a control impulse through free space, signal detection means responsive to said signal means for effecting the operation of said switch means as said member approaches either of said positions to first reduce the speed of said supported member and subsequently stop said supported member at the position, means for directly connecting said gauge member to one of said first two mentioned members, and means for operatively connecting said signal detection means to the other of said first two mentioned members whereby said signal means and said signal detecting means are moved relative to each other in timed relation to relative movement between said members.

2. In combination with a machine or the like having a supporting member, a member movably supported upon said supporting member and indexable in one direction to a plurality of successive stop positions and multiple speed power actuated means for moving said last-named member relative to said supporting member; electric switch means for reducing the speed of and stopping said power actuated means, switch operating electromagnetic radiation signal means for each of said positions, signal detection means responsive to said switch operating signal means for effecting the operation of said switch means as said member approaches either of said positions to first reduce the speed of said supported member and subsequently stop said supported member at the position, means for directly connecting said switch operating electromagnetic radiation signal means to one of said first two mentioned members, and means for operatively connecting said signal detection means to the other of said first two mentioned members whereby said signal means and said signal detecting means are moved relative to each other in timed relation to relative movement between said members.

3. In combination with a machine or the like having a supporting member, a member movably supported upon said supporting member and indexable in one direction to a plurality of successive stop positions and multiple speed power actuated means for moving said last-named member relative to said supporting member; electric switch means for reducing the speed of and stopping said power actuated means, signal means comprising alternate light and dark areas, signal detection means comprising a photoelectric cell responsive to said light and dark areas for effecting the operation of said switch means as said member approaches either of said positions to first reduce the speed of said supported member and subsequently stop said supported member position, means for directly connecting said signal means to one of said first two mentioned members, and means for connecting said signal detection means to the other of said first two mentioned members whereby said signal means and said signal detecting means are moved relative to each other in timed relation to relative movement between said members.

4. In combination with a machine tool or the like having a supporting member, a member movably supported upon said supporting member and indexable in one direction to a plurality of successive stop positions and multiple speed power actuated means for moving said last-named member relative to said supporting member; electric switch means for reducing the speed of and stopping said power actuated means, a gauge member having a plurality of spaced signal means thereon, signal detection means responsive to said signal means while mechanically spaced therefrom for effecting the operation of said switch means as said member approaches a stop position to first reduce the speed of said supported member and subsequently stop said supported member at the position, means for directly connecting said gauge member to one of said first two mentioned members, and means for operatively connecting said signal detection means to the other of said first two mentioned members whereby said signal means and said signal detecting means are moved relative to each other in timed relation to relative movement between said members.

5. In combination with a machine tool or the like having a supporting member, a member movably supported upon said supporting member and indexable in one direction to a plurality of successive stop positions and multiple speed power actuated means for moving said last-named member relative to said supporting member; electric switch means for reducing the speed of and stopping said power actuated means, a gauge member having signal means formed integral therewith, signal detection means responsive to said signal means for effecting the operation of said switch means as said member approaches a stop position to change the speed of said power means and subsequently stop said supported member at the position, means for directly connecting said gauge member to one of said first two mentioned members, and means for operatively connecting said signal detection means to the other of said first two mentioned members whereby said signal means and said signal detecting means are moved relative to each other in timed relation to relative movement between said members.

6. In combination with a machine tool or the like having a supporting member, a member movably supported upon said supporting member and indexable in one direction to a plurality of successive stop positions and multiple speed power actuated means for moving said last-named member relative to said supporting member; electric switch means for reducing the speed of and stopping said power actuated means, a gauge member having a plurality of spaced signal means formed integral therewith, signal detection means responsive to each of said signal means as said member approaches a stop position for effecting the operation of said switch means to change the speed of said power means and subsequently stop said supported member at the position, means for directly and detachably connecting said gauge member to one of said first two mentioned members, and means for operatively connecting said signal detection means to the other of said first two mentioned members whereby said signal means and said signal detecting means are moved relative to each other in timed relation to relative movement between said members.

7. In combination with a machine tool or the like having a supporting member, a member movably supported upon said supporting member and indexable in one direction to a plurality of successive stop positions and multiple speed power actuated means for moving said last-named member relative to said supporting member; electric switch means for reducing the speed of and stopping said power means, a first signal means for each of said positions, a first signal detection means responsive to said first signal means for effecting the operation of said switch means to reduce the speed of said power means, a second signal means for each of said positions, a second signal detection means responsive to said second signal means for effecting operation of said switch means to stop said supported member, means for directly connecting said first and second signal means to one of said first two mentioned members, and means for operatively connecting said first and second signal detection means to the other of said first two mentioned members whereby said signal means and said detecting means are moved relative to each other in timed relation to relative movement between said members.

8. In combination with a machine tool or the like having a supporting member, a member movably supported upon said supporting member and indexable in one direction to a plurality of successive stop positions and multiple speed power actuated means for moving said last-named member relative to said supporting member; electric switch means for reducing the speed of and stopping said power actuated means, a first switch operating signal means for each of said positions, a first signal detection means responsive to said first switch operating signal means for effecting the operation of said switch means to reduce the speed of said power means, a second switch operating signal means for each of said positions comprising alternate light and dark areas, a second signal detection means comprising a photoelectric cell responsive to said light and dark areas for effecting operation of said switch means to stop said supported member, means for directly connecting said first and second switch operating signal means to one of said first two mentioned members, and means for operatively connecting said first and second signal detection means to the other of said first two mentioned members whereby said signal means and said detecting means are moved relative to each other in timed relation to relative movement between said members.

References Cited in the file of this patent

UNITED STATES PATENTS

| Number | Name | Date |
|---|---|---|
| 1,656,313 | Blood et al. | Jan. 17, 1928 |
| 1,868,016 | Marsilius et al. | July 19, 1932 |
| 2,259,574 | Lillquist | Oct. 21, 1941 |
| 2,308,709 | Newman | Jan. 19, 1943 |
| 2,329,756 | Granberg et al. | Sept. 21, 1943 |
| 2,438,098 | Tandler et al. | Mar. 16, 1948 |
| 2,443,278 | Stratton | June 15, 1948 |
| 2,469,594 | Danforth | May 10, 1949 |